(No Model.)
L. BRILLINGER.
SNOW PLOW.
No. 390,338. Patented Oct. 2, 1888.
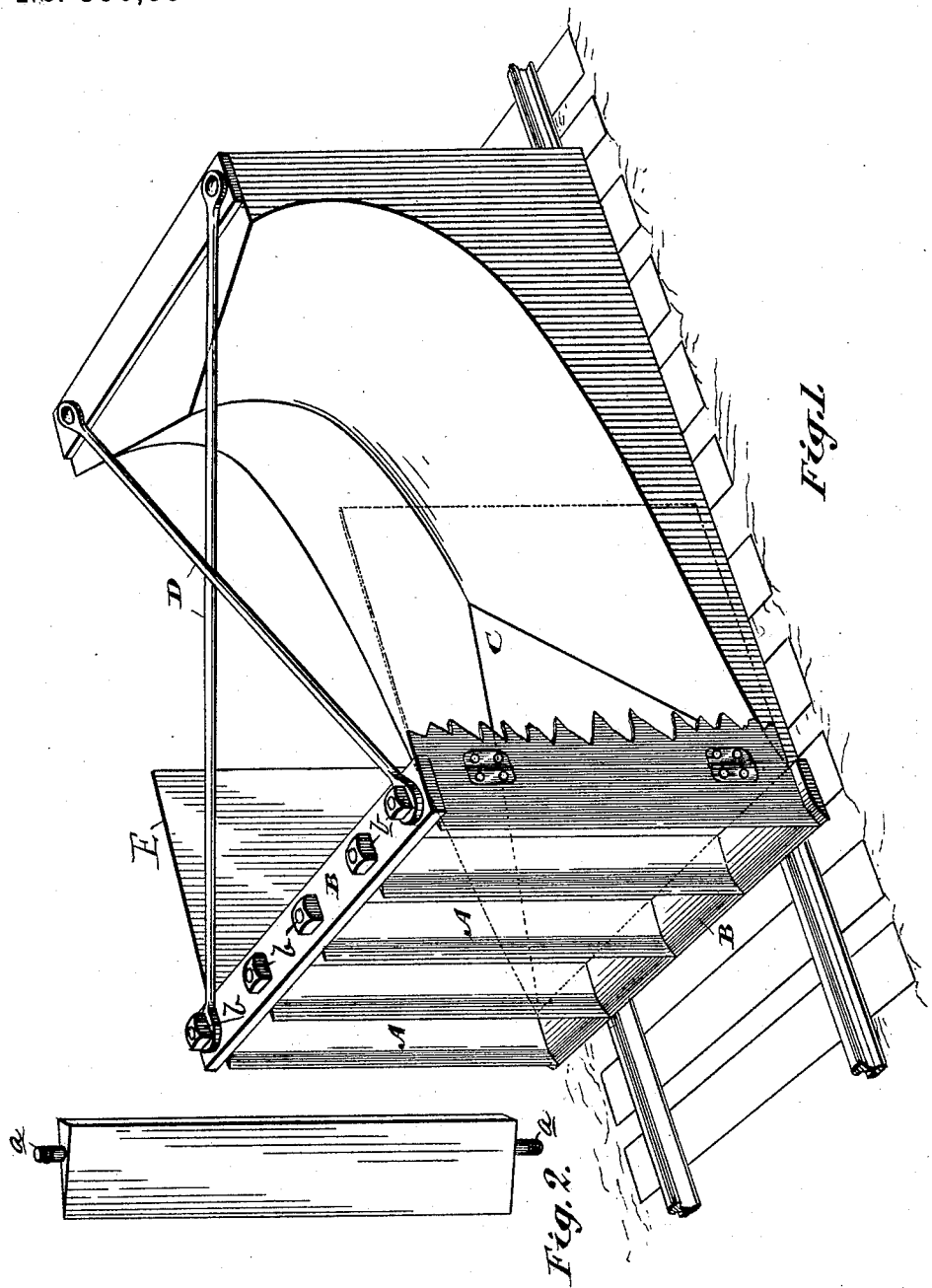
Witnesses.
F. B. Fetherstonhaugh
J. M. Jackson
Inventor
Levi Brillinger
by
Donald C. Ridout & Co
Attys

UNITED STATES PATENT OFFICE.

LEVI BRILLINGER, OF COLLINGWOOD, ONTARIO, CANADA, ASSIGNOR OF ONE-HALF TO LAWRENCE H. KIRKBY, OF SAME PLACE.

SNOW-PLOW.

SPECIFICATION forming part of Letters Patent No. 390,338, dated October 2, 1888.

Application filed January 12, 1888. Serial No. 260,475. (No model.)

*To all whom it may concern:*

Be it known that I, LEVI BRILLINGER, of the town of Collingwood, in the county of Simcoe, in the Province of Ontario, Canada, mechanic, have invented a certain new and useful Improved Snow-Plow, of which the following is a specification.

The object of the invention is to design a plow that will cut the bank of snow into blocks as it enters the snow-drift; and it consists in the peculiarities of construction, substantially as shown, and hereinafter more particularly explained and claimed.

Figure 1 is a perspective view of a plow provided with my cutting attachment, one side plate being removed. Fig. 2 is a detail of the cutting-blades.

It is well known that in cutting through a bank of snow by manual labor the laborer will manipulate his shovel so as to cut the snow into blocks easy to remove, and it is for the purpose of following out this plan of shoveling snow that my invention is devised.

In the accompanying drawings, A are a series of blades held in the frame B, which is fixed to the plow C, as shown, and securely braced by the rods D. Each blade is formed at each end with a screw-threaded pin, $a$, which, when the blades are in place, project through the top and bottom cross-pieces of the frame B and receive the nuts $b$, which detachably secure them in place, and the nuts on the end blades also serve to secure the rods D in place, as shown in Fig. 1.

When the nose of the plow enters a snowdrift, the blades A will cut through the bank, dividing it into vertical blocks, which will be readily thrown off from the sides of the plow C as it pushes its way through the drift. With the view of carrying the blocks of snow so cut farther up on the plow I sometimes fix to either side of the plow the side plates, E, which are detachably connected, so that they may be removed, if desired.

I do not confine myself to placing the blades A in a row at right angles to the length of the plow, as it will be readily understood that if the nose of the plow is pointed the frame would be shaped so as to carry the blades at the angle of the point.

What I claim as my invention is—

The combination, with the plow and the frame secured thereto, of the wedge-shaped blades formed with screw-threaded pins $a$, the brace-rods, and the nuts $b$, engaging said pins and securing said rods and blades to the frame, substantially as described.

Collingwood, January 5, 1888.

LEVI BRILLINGER.

In presence of—

C. SAMON,
   *Barrister, Collingwood.*
EWEN CAMERON,
       *Student.*